United States Patent [19]

Miller et al.

[11] Patent Number: 4,593,646

[45] Date of Patent: Jun. 10, 1986

[54] EGG INJECTION METHOD AND APPARATUS

[75] Inventors: Gary E. Miller, Fountain Valley; Perry Sheeks, Orange, both of Calif.

[73] Assignee: Agrimatic Corporation, Paramount, Calif.

[21] Appl. No.: 383,839

[22] Filed: Jun. 1, 1982

[51] Int. Cl.⁴ ............................................. A01K 45/00
[52] U.S. Cl. ...................................................... 119/1
[58] Field of Search ............................................ 119/1

[56] References Cited

U.S. PATENT DOCUMENTS 3,377,989  4/1968  Sandhage et al. ................... 119/1
4,040,388  8/1977  Miller ................................... 119/1

Primary Examiner—Hugh R. Chamblee

[57] ABSTRACT

A method and apparatus for injecting eggs with injection liquid includes arranging a plurality of eggs in an egg tray, moving the egg-filled tray to an injection station, injecting liquid into the eggs by effecting relative movement between the tray and a plurality of injection needles such that a needle pierces each egg and by forcing injection liquid through each needle into the respective egg, heat-sealing the injection hole in each egg by effecting relative movement between the tray and a plurality of heating devices which apply sufficient heat at the location of the injection hole in each egg to solidify albumin at the hole, applying a coating of liquid hardenable sealing material to the exterior of each egg shell at the location of the injection hole by effecting relative movement between the tray and a source of the sealing material. The needles are cleaned by moving an internal elongated cleaning member longitudinally outwardly in the needle bores in response to a predetermined movement of the needles.

14 Claims, 7 Drawing Figures

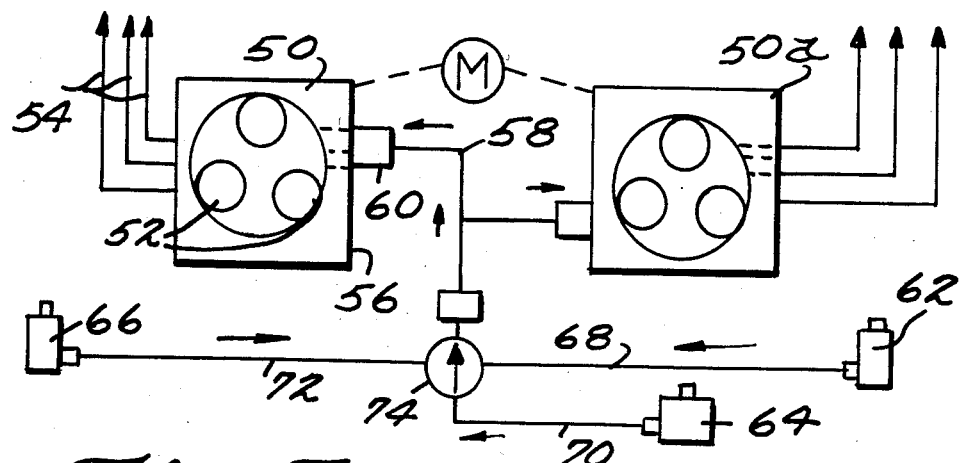
Fig. 7.
Fig. 5.
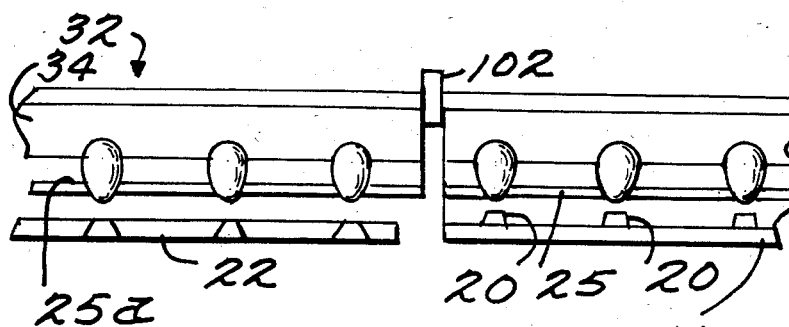
Fig. 6.

4,593,646

EGG INJECTION METHOD AND APPARATUS

This invention pertains to an improved method and apparatus for automatic injection of eggs. More particularly, the invention relates to an improved method which enables high volume immunization or other treatment of hatching eggs by automatically introducing selected antibiotics, bactericides, vaccines, beneficiating chemicals, vitamins or the like into the eggs prior to hatching.

BACKGROUND OF THE INVENTION

A major problem in the poultry industry is the high incidence of infectious diseases which reduce hatchability, increase the cull rate, reduce livability during growout and increase the condemations at the processing plant. It has thus become standard practice in commercial hatchery operations to immunize the birds against such diseases. The most widely used method of accomplishing this immunization is to manually inoculate (by injection of a suitable antibiotic or vaccine) each individual bird after it has been hatched. A skilled operator using automatic equipment can manually inject approximately only 2,000 young birds per hour. The operation is thus relatively expensive.

Another method of inoculation which has become quite popular in turkey hatcheries is egg dipping, whereby a temperature differential or vacuum is used to force the antibiotic solution through the shell of the embryonated egg. This method has the advantage of lower labor cost than manual inoculation; however, because of varying shell porosity and thickness, the amount of solution absorbed by the egg varies dramatically.

A test of 6,174 dipped eggs revealed that 18% of the eggs took in essentially no solution at all and an additional 36% took in too little to be effective. From this test, it was concluded that dipping cannot stop the perpetuation of disease and even encourages the development of organisms resistant to these few antibiotics which are now effective.

Because of the high solution cost and uncertainties associated with dipping, few chick hatcheries dip eggs and almost all hatcheries that do dip eggs (primarily turkey hatcheries) also manually inoculate the day-old birds.

Another method of inoculation involves the use of a hypodermic needle to inject a known quantity of injection liquid into the egg. In the past, eggs have been injected by hand. The operator would use a drill to make a small hole in the shell. A hypodermic needle would be inserted through the hole and a precise amount of solution injected. The hole would then be sealed with cement. It is estimated that eight operators can manually inject 25,000 eggs per day by this method.

An automatic egg injection machine and method are disclosed in U.S. Pat. No. 4,040,388. With this system a plurality of eggs resting in a tray having an apertured bottom are injected from below by a plurality of vertically disposed needle assemblies carried by a vertically movable injection device. Upward movement of the device engages the needle assemblies with the lower ends of the eggs whereupon heating elements in the needle assemblies sterilize portions of the shells. Subsequently each needle is moved upwardly out of its respective needle assembly so as to puncture the shells at the sterilized areas. A separate drive means is provided for each needle. Subsequently injection liquid is injected through the needles, the needles are withdrawn and the heating elements are activated to coagulate albumin at the location of the injection holes so as to seal the holes.

SUMMARY OF THE INVENTION

One feature of the present invention that makes high production rates possible is the use of multiple needle assemblies fixed to a common vertically-movable needle plate. The needle plate is accelerated rapidly upwardly by a single drive device thereby moving all of the needle assemblies positively and simultaneously. The needles impact the eggs at high velocity, the penetrating ends of the needles acting as cutting dies that cause small circular discs the same diameter as the needles to be sheared away from the shell. After the needles enter the egg, the needle plate engages a shock absorber system that slows the needle plate to zero velocity over a short distance (typically $\frac{1}{8}"$) without subjecting the eggs to damaging shock. This feature of multiple needles attached to a common needle plate enables an entire flat of eggs to be pierced simultaneously. The capacity of typical flats may range from as few as 20 eggs to as many as 78 eggs per flat or more. In one embodiment the machine utilizes two needle plates with 34 needles in each plate to pierce the eggs in a 68 egg flat.

Another feature of the invention that improves its reliability is a self-cleaning needle. It was found that the needles would frequently plug. This plugging was eliminated by installing an axially movable cleaning implement such as a wire (typically 0.009 in. dia.) inside each hollow needle tube 0.015 in. I.D.). In the preferred construction a momemtum drive forces the cleaning implement forwardly in the needle bore in response to deceleration of the needle plate. This can be accomplished by attaching the cleaning implement to a small weight. The wire and weight form a hammer assembly which moves inside the needle assembly. When the needle plate impacts the shock absorber system, the needle plate stops abruptly, but the hammer assembly continues to move by virtue of the momentum of the weight attached to the wire. The wire moves inside the needle a distance typically $\frac{1}{4}$ inch. The end of the wire passes through the end of the needle typically 1/16 inch thereby dislodging any foreign material that may have plugged the end of the needle during the previous cycle. The hammer assembly then moves back by gravity and/or spring action to its original position. This self-cleaning action occurs simultaneously in all needles every time the needle plate moving device is actuated.

Another feature of the invention is an improved method and apparatus for introducing small and precisely controlled amounts of injection liquid automatically and simultaneously into multiple numbers of eggs. A peristaltic type pumping action is employed whereby motor-driven rollers engage flexible resilient tubes. The liquid is made to flow by passing the rollers across the tubes so that the tubes are squeezed against the inner surface of the pump housing. A single pump housing is contoured to receive a large number of such tubes, for example 50 or more.

Another feature of this invention is an improved system for sealing the hole in the shell after injection. In Patent No. 4,040,388, the hole was sealed solely by coagulation of albumin at the injection site. It has now been found that a more effective seal can be made by the application of a sealing composition, such as wax, over the injection hole either with or without prior heat-sealing. It was determined that heat-sealing alone is sometimes not adequate to seal the injection hole. The combination of heat-sealing plus composition-sealing insures good hatchability, but composition-sealing alone is frequently sufficient. Test data from over 80 hatches that involved almost one million embryonated turkey eggs injected with antibiotic showed that heat-sealing alone resulted in an average 5.7% hatch depression, while heat-sealing plus wax-sealing resulted in no detectable hatch depression.

The heat-sealing plus composition-sealing process is accomplished by first bringing a heating element in contact with the egg at the point of puncture. The heat coagulates the albumin at the entrance to the hole and provides a weak seal that temporarily prevents albumin and antibiotic solution from being expluised from the egg and also prevents air from entering the egg. In addition to coagulating the albumin, the heat also dries the egg surface in preparation for the composition-sealing step. Composition-sealing can be accomplished with wax by dipping the eggs in a molten wax bath to a depth typically ⅛ inch so that the small end of the egg, and the heat-sealed injection hole, are coated with a thin film of wax approximately ⅜ inch in diameter. This sealing technique is so effective that vacuum lifters can be used to transfer the eggs without breaking the seal. If only heat sealing were used, the vacuum lifters would break the seal and air would be drawn into the egg. The sealing composition is not limited to a wax; it may be a hot melt adhesive or any other liquid which solidifies or hardens after application to the egg.

The following summary of the structure and operation of an exemplary embodiment will be helpful in understanding the invention.

1. Manually place a filled egg tray downwardly on an entrance guide at front of the machine. Place a hold-down plate on top of the eggs in the tray. The bottom of the tray is apertured so that the smaller end of each egg projects downwardly through an aperture.

2. Manually push the tray and hold-down plate horizontally rearwardly into a tray slide frame until the tray engages a cam stop. The tray is now located over a stationary horizontal egg support plate which has an aperture therethrough corresponding to each egg.

3. Manually push down the tray slide frame which engages the tray and moves it down so that the lower ends of the eggs touch the egg support plate. The tray latches in this position. As the tray lowers it contacts a microswitch which activates an egg injection cycle.

4. The injection cycle injects one half of the eggs, then the other half. There are two vertically movable needle plates disposed below the egg support plate in side-by-side relationship. Each plate carries a plurality of upwardly projecting needle assemblies equal in number to one-half of the eggs in the tray. Upward movement of the first needle plate forces the needles into the lower ends of the respective eggs. The upward movement is decelerated by shock absorbers. During deceleration a needle-cleaning implement located internally of each needle assembly moves upwardly through the bore of its respective needle and removes any material which may have lodged in the bore. The implements then move downwardly by gravity and/or spring action so that injection liquid can be injected through the needles. Injection takes place automatically via a single peristaltic pump which forces the injection liquid through a plurality of tubes simultaneously, each tube leading to one of the needle assemblies. The needle plate then moves downwardly automatically to withdraw the needles from the eggs. The other half of the eggs in the tray are then injected by upward movement of the second needle plate, activation of a second peristaltic pump and subsequent downward movement of the second needle plate.

5. The egg tray is automatically returned to its former up position by a tray release mechanism. The tray slide frame is automatically raised away from the hold-down plate.

6. A second identical egg tray is manually placed on the entrance guide at the front of the machine and a hold-down plate is placed on top of the eggs in the tray.

7. Push the second tray into the tray slide frame so that it engages the first tray and releases the cam stop so that the first tray can move rearwardly. Then manually push the second tray and its hold-down plate rearwardly against the first tray so as to move both trays rearwardly. When the second tray engages the cam stop, the second tray is located above the egg-support plate and the two needle plates and the first tray is located above a heater plate. The upper surface of the heater plate carries a plurality of heating units, one for each egg in the first tray.

8. Manually push down the tray slide frame that now contains both trays. This causes both trays to move down until the eggs in the second tray therein contact the egg support plate whereupon an injection cycle is activated as described above. Simultaneously the first egg tray is moved downwardly by the tray slide frame with the result that the lower ends of the eggs in the first tray contact the heating units. Heat transmitted to the eggs causes coagulation of albumin at the location of the injection hole and drys the exterior of the shell at the same location.

9. Manually remove the first tray from the machine and lower it toward a bath of molten wax or other liquid hardenable sealing material. Continue lowering the tray until the lower ends of the eggs therein dip into the sealing material, then raise the tray and place it in a rack to permit the sealing material to solidify or harden.

BRIEF DESCRIPTION OF THE DRAWINGS

FIG. 5 is a longitudinal sectional view of a needle assembly;

FIG. 6 is a schematic fragmentary view taken generally on the line 6—6 of FIG. 1; and FIG. 7 is a schematic view of the injection liquid supply system of the machine.

DETAILED DESCRIPTION

Figure 1:
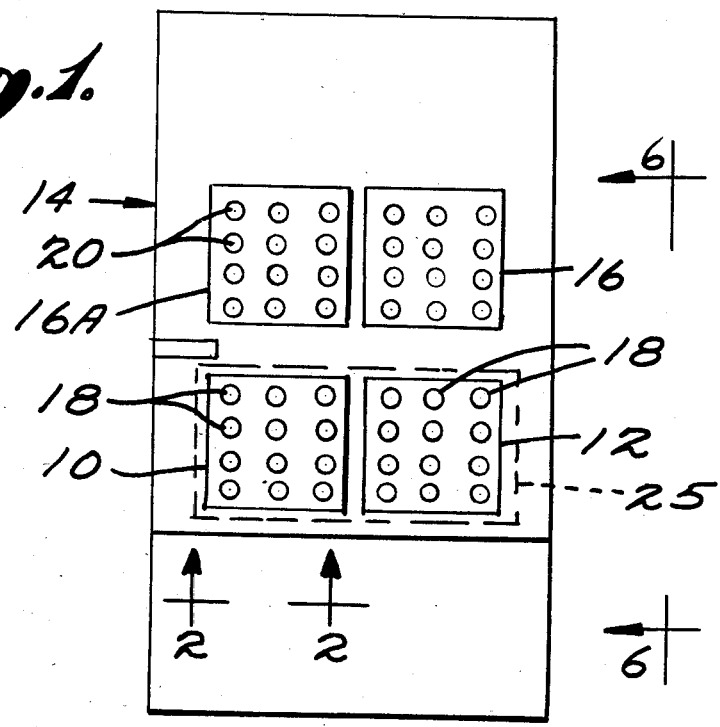
FIG. 1 is a schematic plan view of a machine embodying the principles of the present invention.

The machine illustrated in the drawings includes two side-by-side vertically movable, horizontal needle plates 10 and 12 mounted in a framework 14 in front of a stationary horizontal heater plate 16. Each needle plate 10,12 carries a plurality of vertical needle assemblies 18 which move with the respective plate and which are stationary with respect to that plate. Each needle assembly includes a blunt or square-ended injection needle 19 for piercing the lower end of an egg as the needle plate 10 or 12 moves to its full up position. The heater plate 16 which has an area equal to the combined areas of the needle plates 10 and 12, carries on its upper surface a plurality of thermal conductors 20 which may be heated individually or by heat transfer from a common heat source.

Disposed below the needle plates 10 and 12 is a stationary, horizontal, egg-support plate 22 having a plurality of apertures 24 therethrough, each aperture 24 being located directly above one of the needle assemblies 18. A tray 25 of eggs 26 is adapted to be positioned over the egg-support plate 22, the bottom 28 of the tray having a plurality of apertures 30 through each of which the smaller end of an egg 26 projects. An egg hold-down plate 32, not connected to the machine, is placed over the upper ends of the eggs 26 to hold the eggs 26 against the bottom 28 of the tray. To prevent crushing or cracking of the eggs 26 the lower surface of the hold-down plate 32 is formed of a layer of resilient elastomeric material, such as a foam pad 34.

Figure 3:
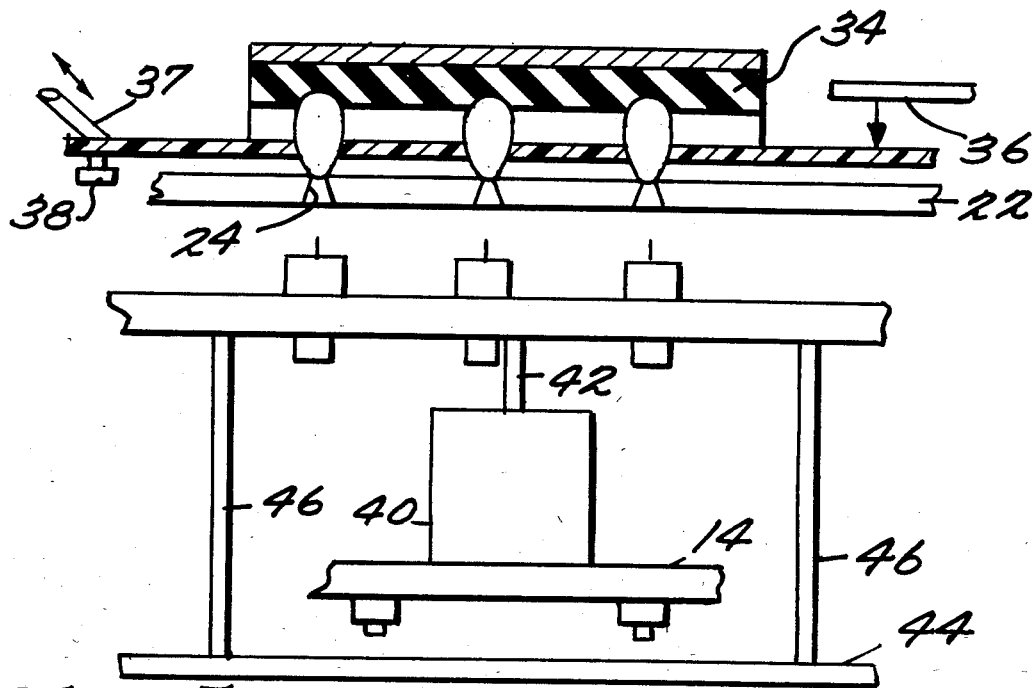
FIG. 3 is a view similar to FIG. 2 showing the components in a different operative position.

A manually operable tray slide frame, illustrated schematically at 36 in FIG. 3, is adapted to move the egg tray and the hold-down plate 32 downwardly so that the lower ends of the eggs engage in the apertures 24 in the stationary support plate 22. The foam pad 34 compresses to compensate for differences in the size of the eggs and to hold the eggs snugly against the support plate 22.

Figure 2:
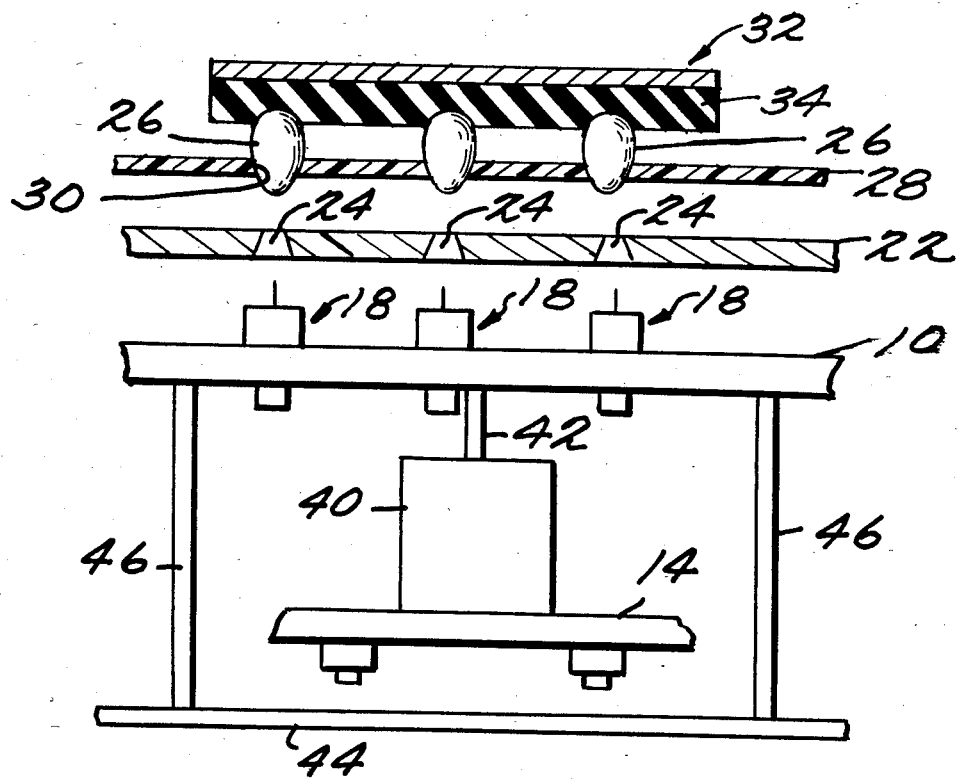
FIG. 2 is a schematic fragmentary view taken generally on the line 2—2 of FIG. 1.
Figure 4:
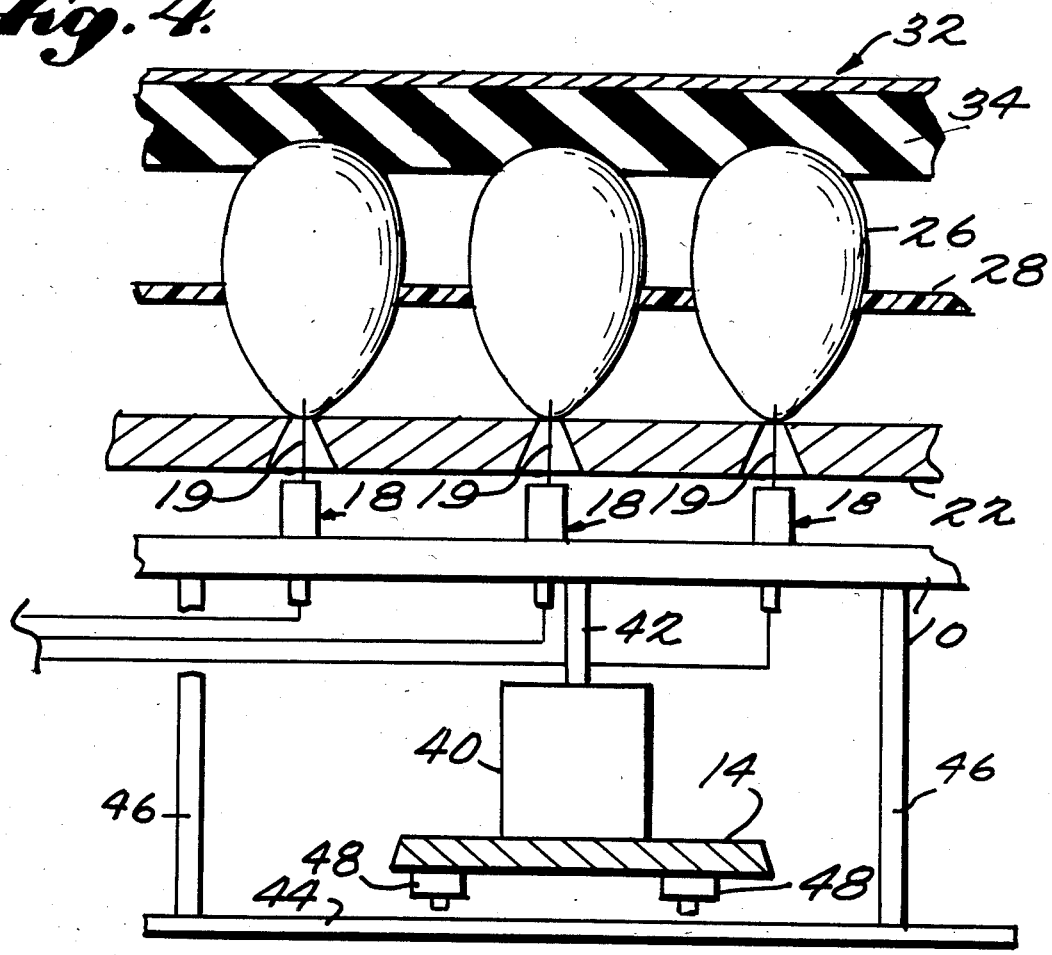
FIG. 4 is a view similar to FIG. 3 showing the components in a still different operative position.

When the egg tray arrives at a predetermined down position, a latching mechanism 37 latches the tray slide frame in that position. Simultaneously the bottom 28 of the tray engages a microswitch 38 which activates an injection cycle for the eggs 26 which overlie the needle plate 10. This cycle, which is controlled by a control system (not shown), begins with a rapid upward movement of the needle plate 10 effected by a suitable drive means such as a solenoid drive 40. The drive 40 is fixed to the framework 14 of the machine and operates on a vertical shaft 42 which is connected to the needle plate 10. Also connected to the needle plate 10 is a bumper assembly which includes a horizontal bumper 44 disposed below the drive 40 and vertical connecting members 46 extending between the bumper 44 and the needle plate 10. Before activation of the drive 40 the needle plate 10 is in the position shown in FIGS. 2 and 3. During activation of the drive 40 the needle plate 10 moves upwardly to the position shown in FIG. 4, the final position of the needle plate 10 being limited by engagement of the bumper 44 with a pair of shock absorbers 48 which are fixed to the framework 14. The shock absorbers 48 rapidly decelerate the needle plate 10 and bring it to a stop at a position in which the needles 19 have pierced the eggs 26. There is very little shock transmitted to the eggs 26 by the piercing operation and by deceleration of the needle assemblies and consequently egg shell cracking is almost non-existent and occurs only occasionally with eggs having unusually thin shells. Without the shock absorber system the extent of shell cracking can be significant. Deceleration of the needle assemblies 18 also effects cleaning of the needles 19 by an internal arrangement within each needle assembly 18, described in detail with respect to FIG. 5.

While the needles 19 of the needle plate 10 are still in the eggs 26 a predetermined amount of injection liquid is injected into each egg 26 by the automatic actuation of a peristaltic pump 50. The pump 50 includes a rotor carrying a plurality of parallel coextensive rollers 52 arranged in a circular pattern. A plurality of flexible tubes 54, one for each needle assembly 18 on the needle plate 10, is disposed between the rollers 52 and a pump housing 56 whereby rotation of the rotor through a predetermined arc squeezes each tube 54 with a peristaltic movement so as to force a predetermined amount of injection liquid through each tubé 54. Simultaneously, injection fluid from a supply line 58 is drawn into a manifold 60 to which each of the flexible tubes 54 is connected at a location upstream from the rollers 52. After the injection liquid has been injected, the pump 50 and solenoid drive 40 are deactivated automatically whereupon the needle plate 10 returns to its down position (FIGS. 1 and 2) by gravity, optionally with spring assist.

The injection liquid supply also includes an injection liquid reservoir 62, a wash solution reservoir 64 and a rinse solution reservoir 66. Lines 68, 70 and 72 lead from these reservoirs to a manually operable selector valve 74 which is a three-position valve adapted to connect the line 58 with any one of the lines 68, 70 or 72. When it is desired to wash out the needle assemblies 18 the pump 50 can be operated continuously and the selector valve 74 turned to a position in which wash solution from the reservoir 64 is drawn through the lines 70 and 58 and forced through the tubes 54 and the needle assemblies. Subsequently the valve is turned to a position to draw rinse liquid from the reservoir 66, the line 72 and the line 58.

A second peristaltic pump 50a is connected to the line 58 for supplying the needle assemblies 18 of the second needle plate 12. Both pumps 50 and 50a may be driven by a common motor M.

FIG. 5 shows one of the needle assemblies 18 in longitudinal cross section. The main body of the assembly 18 is a barrel 76 having a central bore 78 and open ends. The external surface of the barrel 76 is provided with external screw threads 80 to enable it to be screwed into a complementary threaded hole in one of the needle plates 10 or 12. The rear end of the barrel 76 is closed by an externally threaded connector piece 82 having a longitudinal bore 84 which is connected to the end of one of the tubes 54 by means of a swage lock device 86. The forward end of the barrel 76 is closed by a needle adaptor 88 having a longitudinal bore 90 to which is secured the respective injection needle 19.

Within the bore 78 of the barrel 76 and the bore 90 of the adaptor 88 is a needle-cleaning implement in the form of a thin wire 92 attached at its rear end to a cylindrical weight 94 which is longitudinally slidable between the rear connector piece 82 and the front adaptor 88. The rear end of the weight 94 is engageable with the rear connector piece 82 when the weight 94 is in its rearward or at-rest position, as illustrated in FIG. 5. A diametric groove 96 in the connector piece 82 ensures that the weight 94 will not block flow of injection liquid from the tube 54 into the bore 78 of the barrel 76. In this position the forward end of the wire 92 resides in the bore of the needle 19 at a location slightly rearward of the axially-facing needle opening 98. In the forward or operative position of the weight 94, when in engagement with the needle adaptor 88, the forward end of the wire 92 resides slightly forward of the needle opening 98.

Cleaning of any unwanted material from the needle opening 98 of each needle 19 occurs during rapid deceleration of the needle plate 10 by the coaction of the bumper 44 with the shock absorbers 48. The momentum of the weight 94 is sufficient to cause the weight 94 to continue to move upwardly as the remainder of the needle assembly 18 comes to a stop. In so doing the weight 94 moves toward the forward end of the barrel 76 thereby causing the wire 92 to move up through the open end 98 of the needle 19 and dislodge any solid material which may have lodged therein. The weight 94 and wire 92 then drop back by gravity.

In operating the machine an operator places an egg-filled tray 25, shown in phantom lines in FIG. 1, in the machine in a position overlying the two needle plates 10 and 12. This can be accomplished by first placing the tray 25 on a front entrance guide 100 and pushing the tray 25 rearwardly into the tray slide frame 36 until it engages a cam stop 102. The tray slide frame 36 is manually lowered, forcing the tray 25 downwardly until the lower ends of the eggs 26 engage the stationary egg support plate 22, whereupon the latch mechanism 37 latches the tray slide frame 36 in its lowered position. Simultaneously, the microswitch 38 is contacted by the tray 25 with the result that the needle plate 10 moves upwardly to effect injection of one-half of the eggs in the tray 25, as described previously. The control system (not shown) then causes the other needle plate 12 to effect injection of the other half of the eggs in the tray 25, following which the latch mechanism 37 is released to permit the tray 25 to move up to its initial position, the tray slide frame automatically rising with the tray. Then the operator inserts a second egg-filled tray 25a (FIG. 6) in front of the tray 25, and pushes the second tray rearwardly against the first tray 25. This action releases the cam stop 102. The cam stop 102 rides on top of the first tray and then moves downwardly to engage and limit movement of the second tray 25a to a position over the needle plates 10 and 12. At this time the first tray 25 will overlie the heater plates 16 and 16a.

The operator then lowers the tray slide frame 36. Both trays 25 and 25a are thereby moved downwardly so that the lower ends of the eggs 26 in the first tray 25 engage the thermal conductors 20 and the lower ends of the eggs in the second tray 25a engage the injection plate 22. Heat transmitted to the eggs in the first tray 25 at the locations of the injection holes seals the holes by coagulation of a small portion of albumin at the holes and also drys the surrounding shell so as to be receptive to a subsequently applied sealing composition. While the eggs in the first tray 25 are being heat-sealed, the eggs in the second tray 25a are being injected. The control system releases the latch 37 whereupon the tray slide frame 36 is raised automatically. The operator then inserts a third tray into the front entrance guide 100. The first tray is manually removed from the machine and manually lowered over a bath of molten wax or other liquid sealing composition until the lower ends of the eggs 26 dip into the bath. As the egg shells at the location of the holes are dry as a result of the heat-sealing operation, the wax adheres well to the shells and forms a thin, tough, flexible coating. Uniformity of coating thickness on sequential batches of eggs is obtained by close control of the temperature of the wax bath. After dipping, each tray is placed in a rack for hardening of the wax coating and subsequent placement in incubators.

What is claimed is:

1. Egg-injection apparatus comprising: means for supporting a plurality of eggs arranged in spaced apart relationship in a common plane; a plurality of parallel laterally-spaced apart needle assemblies mounted in a support, each assembly including a needle having an open outer end and a bore through which liquid material may be passed; means for moving said needle support toward and away from said egg supporting means in a direction parallel to said needles between a first position in which the outer end of each needle pierces an egg and a second position in which the needles are retracted from the eggs; and needle-cleaning means including an elongated cleaning implement positioned within each needle assembly and means for moving the implement longitudinally in the bore of the respective needle to eject unwanted material from the outer end of the respective needle.

2. Egg-injection apparatus as in claim 1 wherein said means for moving said cleaning implement includes drive means responsive to a predetermined movement of the respective needle assembly in said direction parallel to the needle assemblies.

3. Egg-injection apparatus as in claim 1 wherein said means for moving the cleaning implement includes momentum drive means operable to move the cleaning implement toward the open end of the respective needle in response to arrival of the needle support at said first position.

4. Egg-injection apparatus as in claim 3 wherein said momentum drive means includes a weight carried by the respective needle assembly.

5. Egg-injection apparatus as in claim 4 wherein said weight is slidably mounted in a cavity in the respective needle assembly for movement parallel to the respective needle.

6. In a method of injecting eggs by piercing the eggs with needles by simultaneous movement of the needles toward and into engagement with the eggs and thereafter injecting liquid material through the needles into the eggs the improvement which comprises ejecting unwanted solid material from the bores of the needles by moving an internal elongated cleaning implement longitudinally outwardly in the bore of each needle in response to a predetermined movement of the needles.

7. Egg-injection apparatus comprising a horizontal, stationary egg support plate having a plurality of apertures therethrough of a size sufficiently small to prevent the lower ends of eggs from projecting therethrough; a vertically movable, horizontal egg-carrying plate disposed above said support plate, said egg-carrying plate having apertures therethrough of a size sufficiently large to permit the lower ends of eggs to project therethrough; means for lowering said egg-carrying plate so as to engage the lower ends of eggs carried thereby with the upper surface of said support plate at the location of said apertures; a horizontal, vertically movable injection needle support plate below said egg support plate; a plurality of needle assemblies carried by said needle support plate, said needle assemblies being fixed to said needle support plate so as to be movable therewith and being arranged such that a needle projecting upwardly from each assembly is in alignment with one of said apertures in said egg support plate; drive means for moving said needle support plate upwardly toward said egg support plate such that all of said needles simultaneously pass through said apertures in said egg support plate and into the respective egg; and means for supplying injection liquid to each needle assembly for injection through the respective needle into the respective egg.

8. Apparatus as in claim 7 including a stationary heat-sealing station adjacent said egg support plate for receiving said egg-carrying plate after injection, said station including heating means adapted to be engaged by the lower ends of the eggs in said egg-carrying plate to thereby coagulate albumin at the location of the injection holes in the eggs.

9. Apparatus as in claim 7 wherein said means for supplying injection liquid includes a peristaltic pump having a rotatable roller assembly cooperating with a plurality of flexible tubes disposed between the roller assembly and a pump housing, one end of each tube being connected to a common source of injection liquid and the other end of each tube being connected to one of the needle assemblies.

10. Egg-injection apparatus as in claim 7 wherein said drive means for said needle support plate includes a solenoid drive for effecting upward movement of said needle support plate and shock absorber means for rapidly decelerating the upward movement of said needle support plate and bringing it to a stop at a position in which the needles have projected upwardly through the apertures in said egg support plate.

11. A method of injecting eggs with injection liquid comprising: arranging a plurality of eggs in an egg tray; moving the egg-filled tray to an injection station; injecting liquid into the eggs at said injection station by effecting relative movement between the tray and a plurality of injection needles such that a needle pierces each egg and by forcing injection liquid through each needle into the respective egg; moving the tray of eggs to a heat-sealing station; heat-sealing the injection hole in each egg at said heat-sealing station by effecting relative movement between the tray and a plurality of heating devices which apply sufficient heat at the location of the injection hole in each egg to solidify albumin at the hole; moving the tray of eggs to a further sealing station and applying a coating of liquid hardenable sealing material to the exterior of each egg shell at the location of the injection hole by effecting relative movement between the tray and a source of the sealing material.

12. A method as in claim 11 wherein movement of said tray of eggs from said injection station to said heat-sealing station is effected by engaging a second egg-filled tray with said first-mentioned tray and moving said second tray against said first-mentioned tray and into said injection station thereby moving said first-mentioned tray to said heat-sealing station.

13. A method as in claim 11 wherein said injection needles are fixed to a support plate and wherein the relative movement between said needles and the tray of eggs is effected by moving said plate toward the tray.

14. A method as in claim 11 wherein the step of applying sealing material to the exterior of each egg shell at the location of the injection hole is effected by simultaneously dipping all of the eggs into a bath of the sealing material.

* * * * *